Aug. 26, 1941.   A. E. PETERSON   2,254,088
AUTOMOBILE HOOD AND HINGE
Original Filed July 9, 1938   3 Sheets-Sheet 1
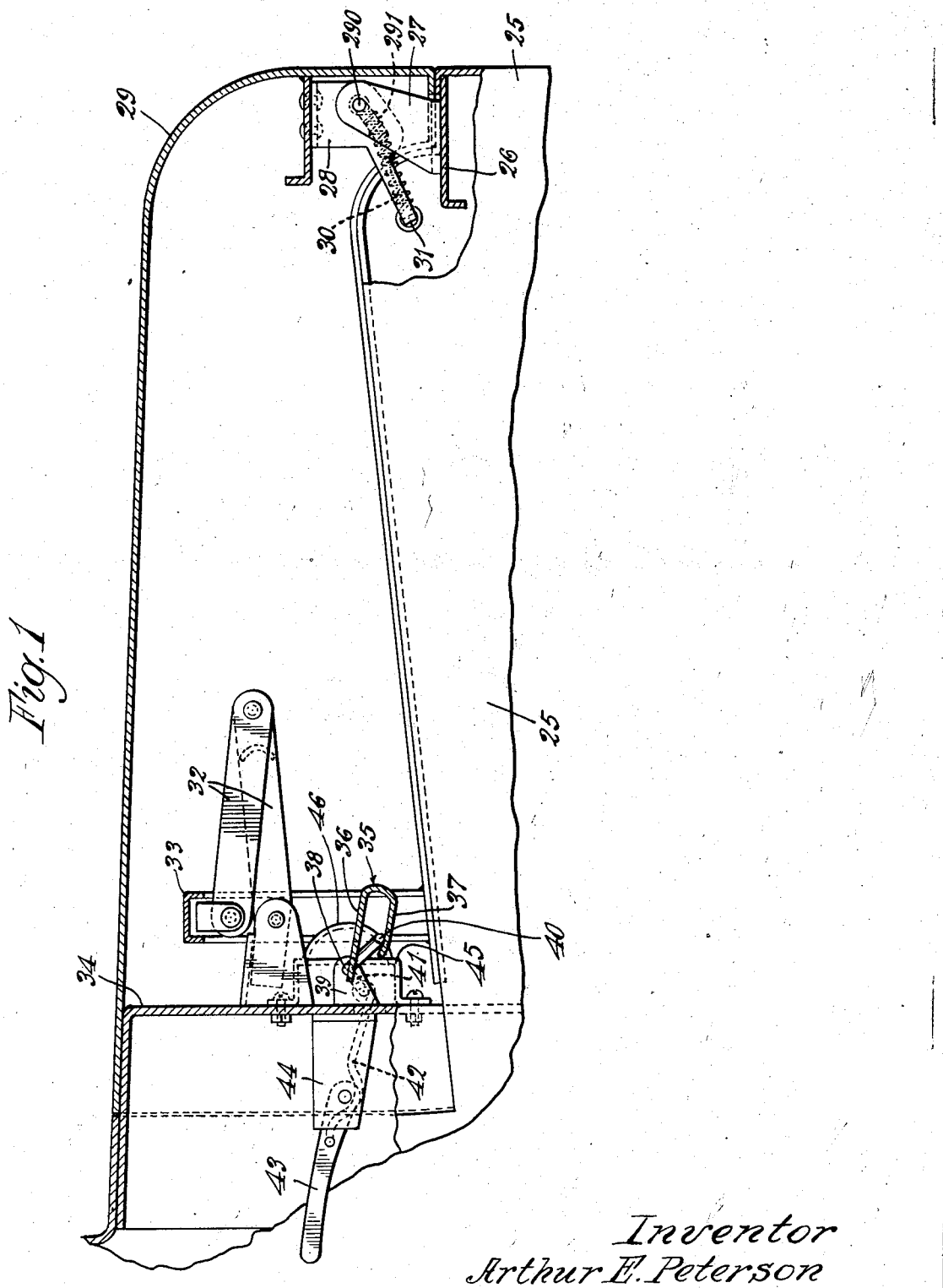
Inventor
Arthur E. Peterson
by Parker & Carter
Attorneys

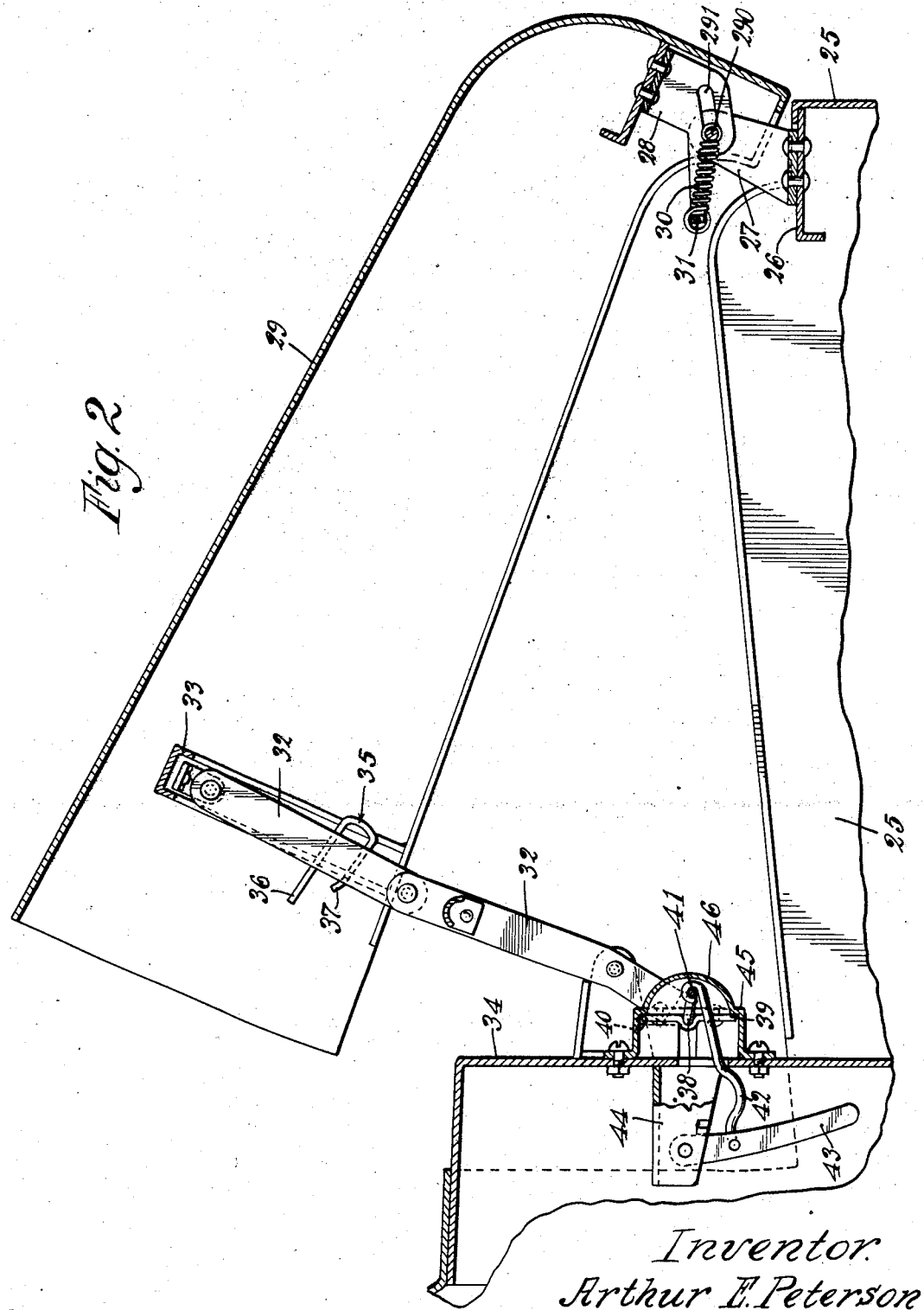

Aug. 26, 1941.   A. E. PETERSON   2,254,088
AUTOMOBILE HOOD AND HINGE
Original Filed July 9, 1938   3 Sheets-Sheet 3
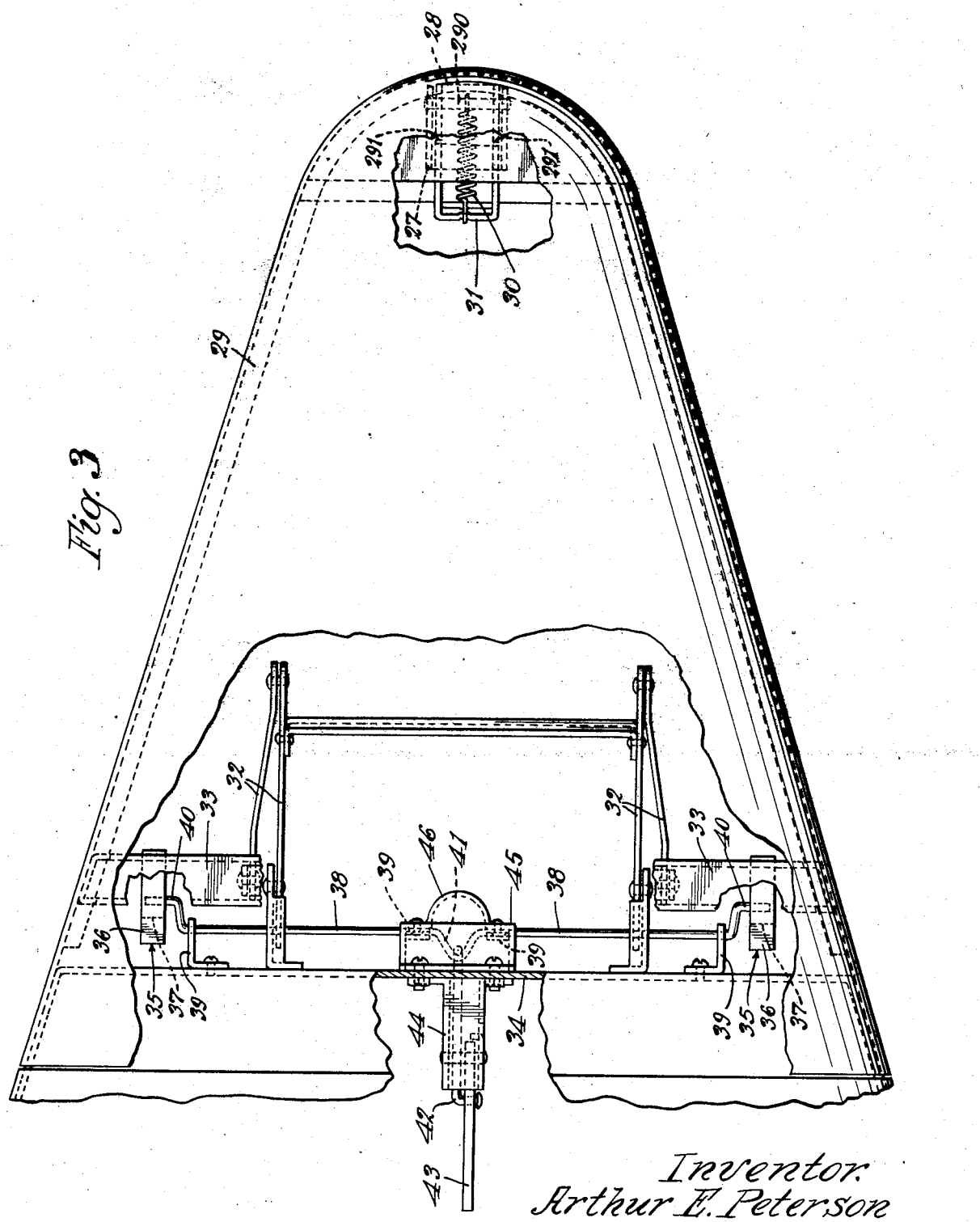
Inventor.
Arthur E. Peterson
by Parker Reuter
Attorneys.

Patented Aug. 26, 1941

2,254,088

UNITED STATES PATENT OFFICE 2,254,088

AUTOMOBILE HOOD AND HINGE

Arthur E. Peterson, Chicago, Ill., assignor to Chicago Forging & Manufacturing Company, Chicago, Ill., a corporation of Illinois Original application July 9, 1938, Serial No. 218,374. Divided and this application August 4, 1939, Serial No. 288,268

4 Claims. (Cl. 16—179)

My invention relates to improvements in automobile hood hinges and especially to do with that type of hood hinge which is used in connection with automobile hoods wherein the upper portion of the hood only is raised and wherein the hood is pivoted at the front end of the vehicle.

One object is the provision of an improved hinge structure for the forward end of the hood.

Another object is the provision of a hinge structure for the forward end of the hood which is particularly adapted for hood structures in which the rear end of the hood is raised, for example, by the employment of a handle located within the interior of the vehicle and adjacent the seat of the operator.

Other objects will appear from time to time throughout the specification and claims.

I illustrate my invention more or less diagrammatically in the accompanying drawings, wherein:

Fig. 1 is a longitudinal vertical section through a hood illustrating my hinge in position when the hood is in lowered position;

Fig. 2 is a view similar to Fig. 1, with the rear end of the hood raised; and

Fig. 3 is a plan view with parts broken away and parts in horizontal section.

This is a division of my co-pending application Serial No. 218,374, filed on July 9, 1938, issued as United States Letters Patent No. 2,193,111, on March 12, 1940.

Like parts are indicated by like characters throughout the specification and drawings.

Referring to the drawings, 25 is the engine housing. In this case, it is shown as a one-piece structure comprising two diagonal side panels with a curved portion joining them, which may be a radiator grille. These side members immediately behind the curved portion are reinforced and joined by a cross member 26, upon which is a bracket 27, on which is pivoted a hinge member 28, on the front end of the hood 29, in order that when the hood is closed it may present an unobstructed smooth surface, and in order to permit pivoting of the upper part of the hood on the lower. The bracket 27 carries a fixed pin 290, which travels in a slot 291 in the hinge member 28. A spring 30, anchored at one end on the pin 290, and at the other end on a yoke or stirrup 31, extending rearwardly from the hinge member 28, in part supports the weight of the forward end of the hood, and when the hood is lifted from its partially open position, as it rotates, the forward end slides forwardly under the influence of the spring to raise the front end of the hood above and move it forwardly in front of the remainder of the body, whereby upward rotation of the hood may take place without interference.

32 is a toggle structure pivoted at one end on a cross bar 33, extending across the hood at its rear end. The other end of the toggle structure is pivoted to the dash 34. This toggle structure is free to be swung slightly off center to lock the hood in open position. 35, 35 are latch brackets on the cross bar 33, one at each side. These latch brackets are made up of two generally parallel elements 36, 37, the upper one 36 being longer than the lower one 37. 38 is a latch crank mounted in bearings 39, on the dash of the vehicle and having latch members 40 at each end adapted to engage the latch brackets 36, 37.

41 is the actuating crank portion of the latch bar. It is operated by means of a connecting rod 42, from a hand lever 43, pivoted on a bracket 44, on the dash in the driver's compartment. When the hand lever 43 is in the rearmost position, it rotates the cranks downwardly to lock the hood in position. When it is pushed forwardly, it first releases the latch and then applies pressure to the upper longer latch engaging portion to raise the hood slightly so that the operator may first release the latch, then raise the hood slightly, then get out of the car and raise the hood the rest of the way. By this arrangement, of course, the operator is assured that when the hood is locked and the car is locked, access to the engine is prevented.

It will be understood that the handle 43 can be positioned above its pivot and that in such event it is moved down instead of up toward the locking position.

Two of the bearings 39 are contained within a housing 45, which is bolted to the dash 34. The housing has a curved forward extension 46, so that the crank 41 and the connecting rod 42 may operate within the housing, the latch crank 38 extending out through the bearings 39. These bearings are of course generally tight so that the housing 45 is effectively sealed to prevent the entrance to the driver's compartment of air or gas from the engine compartment, without in any way interfering with the operation of the hood latch from the engine compartment.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

Because of the fact that modern hoods enclosing automobile engines now in many instances are hinged above the engine and on axes perpendicular to the axis of the automobile and so are stiffer and more rigid than those of the past, it has become of the utmost importance to so mount the hood that it will be held in the closed position in rigid locked relationship with the remainder of the housing. Therefore, the hood which I have designed is, so to speak, a three-point supported hood. It is pivoted at the front end and adapted to move up and down about that pivot. It is locked at the rear end at two widely spaced points on opposite sides of the vehicle body so that a three-point support or lock is provided, which insures that the hood will be positively and firmly seated.

The initial opening of the hood, in response to the unlatching, as illustrated in Fig. 2, causes the hood to rotate about the pivot 290, imparting a slight rotation. As soon as the hood is raised above the initial opening position to which it is constrained by the latch, the spring, associated with the stirrup, slides the hood forwardly into the position shown in Fig. 2, so as to enable the hood 29 to clear the housing 25.

I claim:

1. For use with an automobile hood and closure therefor, a hinge for the front end of the closure, including a bracket mounted on the hood and having a generally horizontal transverse pivot member, a hinge member on the closure slotted to receive the pivot member and slidable in relation thereto and rotatable about the axis thereof, the pivot member abutting against the front end of the slot when the closure is in closed position, and a spring adapted to impart a forward movement to the forward end of the closure when the closure is raised, and to thereby bring the rear end of the slot into contact with the pivot when the closure is rotated to raised position, said slot, when the closure is in closed position, being forwardly and upwardly inclined.

2. For use with an automobile hood and closure therefor, a hinge for the front end of the closure, including a bracket mounted on the hood and having a generally horizontal transverse pivot member, a hinge member on the closure slotted to receive the pivot member and slidable in relation thereto and rotatable about the axis thereof, the pivot member abutting against the front end of the slot when the closure is in closed position, and a spring adapted to impart a forward movement to the forward end of the closure when the closure is raised, and to thereby bring the rear end of the slot into contact with the pivot when the closure is rotated to raised position, said slot, when the closure is in closed position, being forwardly and upwardly inclined, and being generally horizontal when the rear end of the closure is raised.

3. For use with an automobile hood and closure therefor, a hinge for the front end of the closure, including a bracket mounted on the hood and having a generally horizontal transverse pivot member, a hinge member on the closure slotted to receive the pivot member and slidable in relation thereto and rotatable about the axis thereof, the pivot member abutting against the front end of the slot when the closure is in closed position, and a spring adapted to impart a forward movement to the forward end of the closure when the closure is raised, and to thereby bring the rear end of the slot into contact with the pivot when the closure is rotated to raised position, one end of said spring being secured to the pivot member, and the opposite end being secured to a rearwardly extending portion of the hinge member.

4. For use with an automobile hood and closure therefor, a hinge for the front end of the closure, including a pair of laterally spaced bracket arms upwardly extending from the hood, a horizontal transversely extending pivot pin extending between and mounted on the bracket arms, a hinge member on the closure having a pair of parallel generally vertical side members, each such side member being slotted, the pin passing through said slots, the pin abutting against the front ends of said slots when the closure is in closed position, a yoke connecting the side members of the hinge member, and a spring adapted to impart forward movement to the forward end of the closure when the closure is raised, and to thereby bring the rear ends of the slots into contact with the pivot when the closure is rotated to raised position, one end of said spring being secured to the pivot pin and the other to said yoke.

ARTHUR E. PETERSON.